Patented Dec. 11, 1951

2,578,437

UNITED STATES PATENT OFFICE 2,578,437

THERMAL PROCESSING OF FOOD PRODUCTS

Charles F. Martin and Virgil O. Wodicka, Chicago, Ill., assignors to Libby, McNeill & Libby, Chicago, Ill., a corporation of Maine No Drawing. Application March 10, 1950, Serial No. 149,035

7 Claims. (Cl. 99—214)

This invention relates to a new and improved method for the thermal processing of food products and more particularly to a method for the heat treatment of food products in sealed cans.

According to present methods in general use, many types of foods are placed in cans which are sealed and thereafter given a heat treatment. Since this treatment creates pressures in the cans which are substantially above atmospheric, these pressures must be counterbalanced by external steam or air pressure to avoid distortion of the cans. This is particularly true of the large size cans, such for example as the #10 can which is six and three-sixteenths inches in diameter by seven inches high. To accomplish these results, it is customary first to cook under steam pressure and then to cool under a balancing pressure of compressed air until the temperature and pressure within the can have been reduced to such a point that the can itself can hold the pressure without danger of distortion.

The cooking or sterilizing heat penetrates slowly through various types of viscous or heavy food materials, such for example as cream corn or pumpkin. This is apparent in the small cans, but is especially significant in the larger type cans. The heat penetrates through the mass of food gradually toward the center and thus, in order to reduce the time of sterilization, considerably higher temperatures are used than are expected to be reached in the center of the can contents. This results in the outer portions of the food adjacent the can walls being given a substantially longer treatment at the higher temperatures. With some foods, such as pumpkin for example, this excessive heat treatment of the outer food content will cause that outer portion of the food to have a darker color and a somewhat bitter taste, both of which are undesirable. Also, there is a certain amount of weepage of the product, that is, there is a breakdown of the solid product which is evidenced by liquid separation.

It is an object of the present invention to provide a new and improved method of heat treating canned food products whereby the temperatures and times of maintenance of temperatures in different portions of a can are rendered more nearly uniform than with methods in general use.

It is a further object to provide a method by which desired central temperatures in a can are reached without excessive temperature in outer areas or excessive time of treatment.

It is also an object to provide a method by which canned foods may be given required heat treatments with substantially shorter periods of application of heat to the can.

It is another object to provide a method of this character which is adapted for commercial application in the production of canned foods.

Other and further objects will appear as the description proceeds.

By way of example, the invention will be discussed and the specific temperature and time relationships given for the canning of pumpkin in #10 size cans. It will be understood that the invention is applicable to other canned foods, especially those in which the contents of the can is relatively solid or viscous so that heat penetration through the material must extend gradually inward from the can surfaces. These cans of pumpkin have heretofore been processed by conventional methods which include, as a first step, a 90 minute heating under steam pressure at 250° F. The internal pressure in the can developed due to the heat is effectively counterbalanced by the steam pressure. After the 90 minutes under steam pressure, the cans are cooled for 15 minutes by means of water maintained under a similar pressure by compressed air introduced into the retort at the time that the steam is turned off. At the end of 15 or 20 minutes, the can temperature and pressure are reduced sufficiently to permit the pressure about the cans to be reduced to atmospheric without distortion of the can.

It has been found, in the course of experimental work, that the center temperatures of the canned contents continued to rise during the pressure cooling period. This is for the reason that the outer portions of the canned contents are at a higher temperature than the center and the temperature differential is such that heat continues to penetrate inwardly even through the outer surface of the can is subjected to cooling temperatures. The center temperature is found to drop abruptly when the applied external pressure on the cans is reduced at the end of the pressure cool. This abrupt drop of the temperature in the center of the can is due to the boiling of the contents which tends to distribute the heat within the container. This occurs whenever the applied external pressure is less than the vapor pressure at the highest temperature which exists in the can.

The process, as described above, gives a can of pumpkin in which the center and adjacent portions of the canned contents are given the proper cooking and sterilization treatment. The outer layers of the canned contents adjacent the inner face of the can are, however, given an excessive heat treatment and tend to become somewhat discolored and darkened with the production of a somewhat bitter taste. These is also found to be a certain amount of weepage which consists in the breakdown of the solid product and liquid separation.

It has been found possible to utilize the continued heat penetration of the canned contents during the cooling period, which assures adequate treatment of the center contents while reducing the period of time during which heat is applied to the exterior of the can. This results in a substantial improvement in the quality of the product. The pumpkin in the sealed cans has been previously heated before being filled into the cans and, at the start of the present process, has an initial temperature of approximately 205° F. It was found that, by processing #10 cans of pumpkin 75 minutes in steam at 250° F., followed by a 45 minute pressure cool, yielded the same sterilizing value at the center of the can as the conventional process of 90 minutes in steam at 250° F. with a 15 minute pressure cool. This, of course, means that the exterior layers of the material in the can have heat applied to them for 15 minutes less than in the usual methods.

With the idea of accomplishing further improvement in the resultant product, further experiments showed that advantageous results could be procured by postponing the start of the cooling period for a time after the end of the heating in the steam. It was necessary to maintain the cans under air pressure in the time interval between heating and cooling to prevent any abrupt change of conditions in the containers. Tests were made, and it was found that a process consisting of 50 minutes heating in steam at 250° F., followed by 40 minutes of holding the cans under air pressure of 15 pounds per square inch and then a 20 minute water cool under 15 pounds per square inch air pressure, yielded essentially the same sterilizing values at the center of the can as in the conventional 90 minute steam period and 15 minute pressure cool. This treatment results in the exposure to heat of the outer portions of the canned contents to 250° F. for the equivalent of approximately 55 minutes instead of 90 minutes. As a result of this treatment, definite improvements in quality were obtained. The canned pumpkin was found to have much the same characteristics as were obtained in the smaller cans through which the heat penetrated more quickly. The dark color and bitter flavor usually obtained in the outer portions of the contents of the larger cans were appreciably reduced and the weepage of the product was also substantially reduced.

Other combinations of time, temperature and pressure may be used with satisfactory results. For example, pumpkin in the #10 cans at an initial temperature of approximately 205° F. may be heated in steam under pressure at 250° F. for 60 minutes, then held under 15 pounds per square inch air pressure for 47 minutes and then pressure cooled in the retorts under 15 pounds per square inch air pressure. As another example, using the same cans and initial temperature, the cans may be heated under steam pressure at 240° F. for 60 minutes, then held under 12 pounds per square inch air pressure for 47 minutes and then pressure cooled in the retorts under 15 pounds per square inch air pressure. As a further example, using the same cans and initial temperature, the cans are heated in steam under pressure at 240° F. for 70 minutes, held under 12 pounds per square inch air pressure for 57 minutes, and then pressure cooled in the retorts under 12 pounds per square inch air pressure.

It is to be understood that the application of heat to the can under steam pressure will be modified to a calculated equivalent time for other initial temperatures if such temperatures vary substantially from the 205° F. on which the above examples are based. The times would also, of course, be varied for different sizes of cans than the #10 can specified.

While specific examples of time and temperature have been given above in connection with the canning of pumpkin, the same general method may be utilized with other products having similar characteristics such as cream style corn, solidly packed sweet potatoes, solidly packed meat products, or any heavy consistency product, by modifying the times and temperatures to compensate for differences in heat penetration rates and sterilizing requirements. The method generally can be carried out by processing food products which transmit heat by conduction in such manner that the cans are exposed to heat for approximately half the time conventionally used and then held under air pressure while the heat absorbed by the can and outer portions of the contents penetrates to the center of the canned contents. When conditions of temperature and time at the center of the can contents are reached which will yield the desired sterilizing values at the end of the process, the cans are then pressure cooled. This results in a substantial saving in the amount of heat that is necessary to be applied to the can and serves to reduce the heat applied to the outer portion of the canned contents. While the saving in heat used is desirable, the most important advantages of the proved process are the improvement of quality of the contents of the can.

While we have described certain preferred examples of methods for carrying out our improved process, it is capable of further variation to meet differing conditions and requirements and we contemplate such modifications as come within the spirit and scope of the appended claims. As an example of such modifications, it will be understood that if the initial temperature varies materially from 205° F. then the period of application of steam heat will be a calculated equivalent time for such other initial temperature.

We claim:

1. The process for thermal treatment of foods of heavy consistency in sealed containers which comprises heating the containers by steam under pressure until the containers and outer portions of the food have reached the desired treatment temperature, holding the containers under pressure without additional application of heat while the heat absorbed by the container and outer portion of the contents penetrates to the center contents and produces the desired sterilizing values, and thereafter cooling the containers and contents under pressure.

2. The process of treatment of pumpkin and foods of similar heavy consistency filled in number 10 cans at temperatures which will yield initial temperatures of substantially 205° F. which comprises heating the cans in steam under pressure for 50 minutes at 250° F., holding said containers under air pressure at 15 pounds per square inch for approximately 40 minutes without additional application of heat, and thereafter cooling the containers under 15 pounds per square inch air pressure.

3. The process of treatment of pumpkin and foods of similar heavy consistency, filled in number 10 cans at temperatures which yield initial temperatures of substantially 205° F. at the start of the process which comprises heating the cans in steam under pressure at 250° F. for 60 minutes, holding the cans under 15 pounds per square inch air pressure for 47 minutes without additional application of heat, then pressure cooling the cans under 15 pounds per square inch air pressure.

4. The process of treatment of pumpkin and foods of similar heavy consistency, filled in number 10 cans at temperatures which yield initial temperatures of substantially 205° F. at the start of the process which comprises heating the cans in steam under pressure at 240° F. for 60 minutes, holding the cans under 12 pounds per square inch air pressure for 47 minutes without additional application of heat, then pressure cooling the cans under 15 pounds per square inch air pressure.

5. The process of treatment of pumpkin and foods of similar heavy consistency, filled in number 10 cans at temperatures which yield initial temperatures of substantially 205° F. at the start of the process which comprises heating the cans in steam under pressure at 240° F. for 70 minutes, holding the cans under 12 pounds per square inch air pressure for 57 minutes without additional application of heat, then pressure cooling the cans under 12 pounds per square inch air pressure.

6. The process of thermal treatment of foods of heavy consistency in sealed containers which comprises heating the containers by steam under pressure at about 250° F. for a period such that the containers and outer portions of the food in the containers have reached approximately the temperature of the steam, holding the containers under approximately the pressure of the steam without additional application of heat and without substantial loss of heat until the heat absorbed by the container and outer portions of the food therein penetrates to the center contents, and thereafter cooling the containers under pressure.

7. The process of thermal treatment of foods of heavy consistency in sealed containers of substantially the size of number 10 cans, said foods at the initiation of said treatment having temperatures of the order of 205° F., which comprises heating the cans in steam under pressure at substantially 250° F. for approximately an hour, holding said containers under air pressure of the order of 15 pounds per square inch without additional application of heat and without substantial loss of heat for a period of the order of three quarters of an hour, and thereafter cooling the containers under air pressure of the order of 15 pounds per square inch.

CHARLES F. MARTIN.
VIRGIL O. WODICKA.

REFERENCES CITED

The following references are of record in the file of this patent:

UNITED STATES PATENTS

| Number | Name | Date |
|---|---|---|
| 1,184,249 | Luhrmann et al. | May 23, 1916 |
| 1,570,236 | Fooks | Jan. 19, 1926 |
| 1,584,397 | Paxton | May 11, 1926 |
| 2,043,310 | Thompson | June 9, 1936 |
| 2,398,082 | Cavallito | Apr. 9, 1946 |